United States Patent
Newburn et al.

(10) Patent No.: US 7,769,964 B2
(45) Date of Patent: Aug. 3, 2010

(54) TECHNIQUE TO PERFORM MEMORY REFERENCE FILTERING

(75) Inventors: Chris J. Newburn, Rockton, IL (US); Kumar Shiv, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 752 days.

(21) Appl. No.: 11/508,016

(22) Filed: Aug. 21, 2006

(65) Prior Publication Data
US 2008/0046668 A1 Feb. 21, 2008

(51) Int. Cl.
*G06F 12/00* (2006.01)
(52) U.S. Cl. .................. 711/154; 711/146; 717/127
(58) Field of Classification Search .............. 711/154, 711/146; 717/127
See application file for complete search history.

(56) References Cited

U.S. PATENT DOCUMENTS

| | | | |
|---|---|---|---|
| 5,295,260 A | | 3/1994 | Pribnow |
| 6,035,378 A | | 3/2000 | James |
| 6,185,668 B1 | * | 2/2001 | Arya .................. 712/23 |
| 6,499,028 B1 | | 12/2002 | Brock et al. |
| 6,931,635 B2 | * | 8/2005 | Inagaki et al. ........... 717/157 |
| 2001/0027511 A1 | | 10/2001 | Wakabayashi et al. |
| 2004/0163083 A1 | * | 8/2004 | Wang et al. ............. 718/102 |
| 2005/0144413 A1 | | 6/2005 | Kuo et al. |
| 2005/0155020 A1 | * | 7/2005 | DeWitt et al. ........... 717/130 |

FOREIGN PATENT DOCUMENTS

| | | |
|---|---|---|
| EP | 0117930 A1 | 9/1984 |
| EP | 1132801 A2 | 9/2001 |

OTHER PUBLICATIONS

"Combined Search and Examination Report for corresponding UK Patent Application No. GB0716299.3, dated Nov. 16, 2007".
Office Action received for CN Patent Application No. 200710146938.4 mailed onFeb. 13, 2009, 17 pages inclusive of English translation.
Office Action received for GB Patent Application No. 0716299.3, mailed on Nov. 16, 2007, 11 pages.
Office Action received for GB Patent Application No. 0716299.3, mailed on Jan. 12, 2009, 1 page.
Office Action received for GB Patent Application No. 0716299.3, mailed on Jun. 5, 2009, 1 page.
Office Action received for DE Patent Application No. 10 2007 039 431.6, mailed on Aug. 22, 2008, 13 pages inclusive of English Translation.

* cited by examiner

*Primary Examiner*—Christian P Chace
*Assistant Examiner*—Hashem Farrokh
(74) *Attorney, Agent, or Firm*—Caven & Aghevli LLC

(57) ABSTRACT

A technique to filter regions of memory. More particularly, at least one embodiment of the invention relates to a technique to detect and filter accesses or information pertaining to a memory access in a computer system.

14 Claims, 7 Drawing Sheets

TECHNIQUE TO PERFORM MEMORY REFERENCE FILTERING

BACKGROUND

1. Field

The present disclosure pertains to the field of computing and computer systems, and, more specifically, to the field of detecting addresses, instructions, data or other references to memory in a computer system.

2. Background

Some computer systems run programs that may be annotated with reference points (e.g., "instrumentation") to track various references to memory by a computer program. For example, some computer programs may include instrumentation code to track a range of addresses accessed by the computer program and some action may be taken in response to accessing a particular address range. Typically, the logic used to compare a program's memory access to some tested range of memory addresses or values and/or performing some function in response to accessing a particular memory range is implemented within a software program or routine.

Performing memory access comparison operations in software may limit the type, number, and frequency of memory accesses that can be monitored, due, for example, to the overhead associated with executing the software necessary to perform these checks. In general, increasing the size of a software program for monitoring functions, such as memory access filtering or monitoring, can decrease computer system performance, while expanding the code size, thereby requiring larger code storage devices and increased system cost.

BRIEF DESCRIPTION OF THE FIGURES

The present invention is illustrated by way of example and not limitation in the accompanying figures.

DETAILED DESCRIPTION

Figure 1:
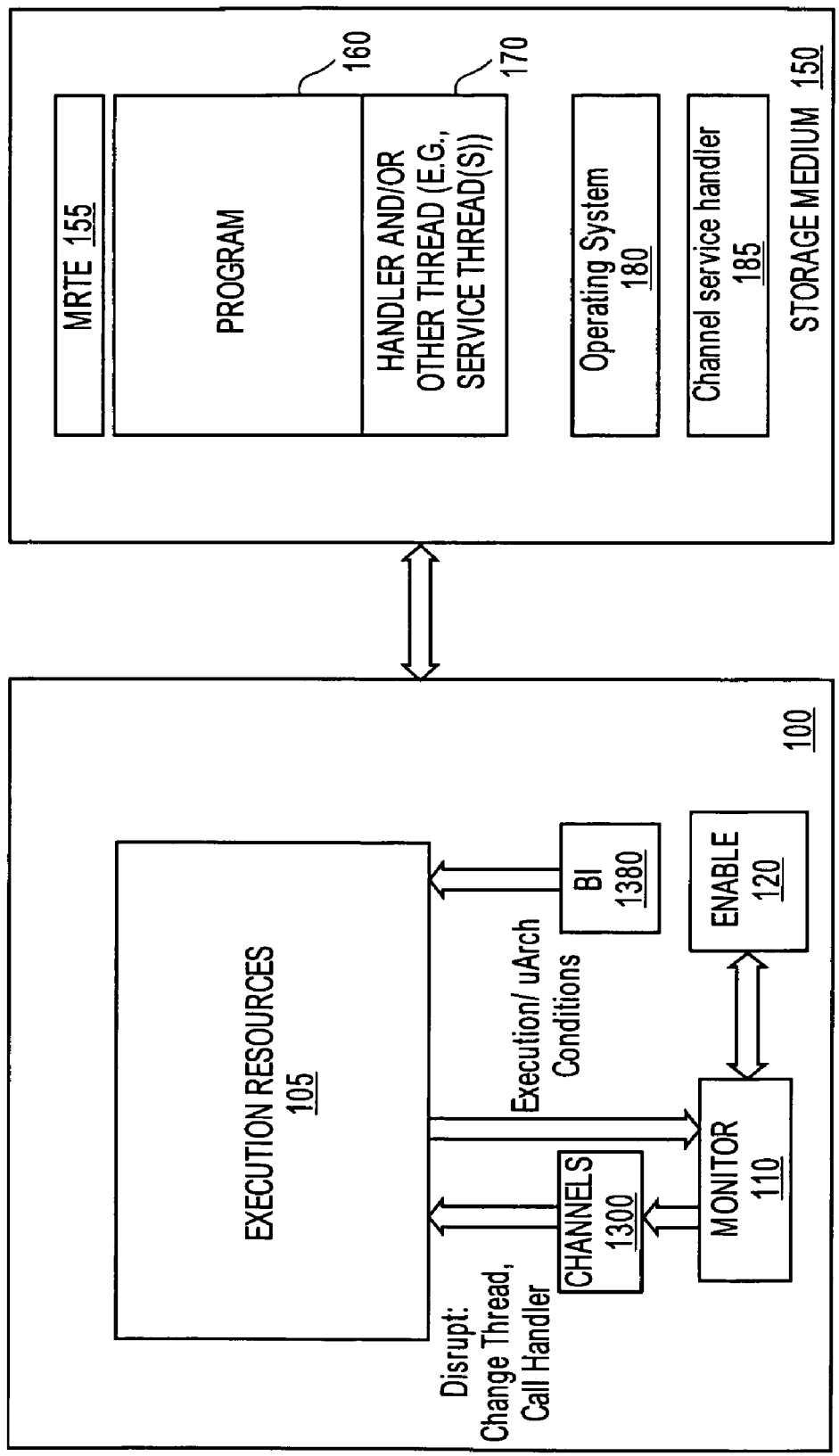
FIG. 1 illustrates one embodiment of a system to monitor various events within a processor.

Embodiments of the invention relate to computer systems. More particularly, at least one embodiment of the invention relates to a technique to detect and filter accesses or information pertaining to a memory access in a computer system.

In one embodiment, accesses to memory by a computer program or other logic can be monitored, and various operations performed in response thereto by using a combination of hardware logic, such as that implemented in circuits within a processor, and one or more software instructions. In one embodiment, hardware programmable logic, such as "channels" may be used to detect accesses of various memory regions or of various data values and perform a function in response to these detected accesses according to various scenarios programmed within the channels. In one embodiment, the occurrence of a particular scenario or combination of scenarios may trigger a fault-like yield event to invoke a handler routine to perform functions in response to the occurrence of the scenario or scenarios.

Because the logic for detecting and responding to the occurrence of a memory reference or access is implemented within hardware logic, in one embodiment, the software responsible for the memory references/accesses is less burdened with overhead code, thereby allowing the software to be performed more efficiently and at greater performance levels than if memory accesses/references were detected and delt with in software. Furthermore, at least one embodiment, allows for more flexibility in the number, type, and combination of various memory accesses and references that may be detected.

In one embodiment, hardware-defined scenarios may monitor various memory accesses within a software program by including an instruction or other code within the program to be monitored that, if performed, causes the scenarios to detect other instructions in the code. For example, in one embodiment an instruction, such as a "sentinel" instruction may be inserted prior, in program order, to an instruction or group of instructions that are to access a memory region. After the sentinel is encountered or performed by a processor running the program, a corresponding channel or channels within the processor or other processor may perform various comparison operations on data, addresses or other information contained in or otherwise associated with instructions performed subsequent to the sentinel in program order. Moreover, if a condition that has been programmed into the channel(s) is satisfied by the performance of the instructions subsequent to the sentinel in program order, then the condition may trigger a fault-like yield event so that a handler can perform some function in response thereto.

In one embodiment, accesses to a range of linear or physical addresses may be accessed by an instruction or group of instruction preceded in program order by a sentinel that causes one or more channels to detect the access and perform some function in response thereto. In other embodiments, data or a range of data stored to a linear or physical memory address may be detected by one or more channels performing one or more scenarios in response to detecting one or more sentinels preceding instructions in program order responsible for storing the data or data range. Furthermore, in one embodiment, a control transfer to a branch target or branch target range may be detected by one or more channels performing one or more scenarios in response to detecting one or more sentinels preceding instructions in program order responsible for performing a branch prediction operation. In other embodiments, other memory references or accesses may be detected by programming channels to perform some scenarios in response to detecting a sentinel within a program. Furthermore, one or more combinations of memory references or accesses (e.g., data or addresses corresponding to a memory access) may be detected in one or more channels by combining the scenarios performed by the channels.

In one embodiment, a region filtering technique may be used to allow a program thread, or other sequence of instructions, to make use of a global memory region, such as a "heap", rather than a more temporary storage area, such as a "stack", in which data may be easily over-written if a pointer to the data is published to programs outside the stack. More specifically, in one embodiment, a portion of the heap ("kindergarten") may be specifically allocated to one or more program threads, regardless of whether pointers to the kindergarten are published to other programs or threads, because existing techniques to maintain the pointers to the heap ("garbage collecting") may be applied to a kindergarten for only those threads having access to the kindergarten. In one embodiment, memory access filtering techniques may enable threads to use the heap kindergarten rather than a stack to store and access information, such that a thread or threads may avoid the temporal qualities of the stack without incurring garbage collecting overhead associated with the entire heap.

FIG. 1 illustrates a system that can monitor conditions of execution resources according to one embodiment. In the embodiment of FIG. 1, execution resources 105, a monitor 110, and enable logic 120 form a portion of a processor 100 that is capable of executing instructions. The execution resources may include hardware resources that may be integrated into a single component or integrated circuit in some embodiments. However the execution resources may include software or firmware resources or any combination of hardware and software and/or firmware that may also be used in execution of program instructions. For example, firmware may be used as a part of an abstraction layer or may add functions to processing hardware, as may software. Software also may be used to emulate part or all of an instruction set or to otherwise assist in processing.

The processor may be any of a variety of different types of processors that execute instructions. For example, the processor may be a reduced instruction set computing (RISC) processor, a complex instruction set computing (CISC) processor, a very long instruction word (VLIW) processor, or any hybrid or alternative processor type. Moreover, special purpose processors such as network or communication processors, co-processors, embedded processors, compression engines, graphics processors, etc., may use disclosed techniques. As integration trends continue and processors become even more complex, the need to monitor and react to internal performance indicators may further increase, thus making presently disclosed techniques more desirable. However, due to rapid technological advance in this area of technology, it is difficult to foresee all the applications of disclosed technology, though they may be widespread for complex hardware that executes program sequences.

As shown in FIG. 1, the processor 100 is coupled to a storage medium 150 such as a memory. The storage medium 150 may be a memory subsystem having various levels of hierarchy which may include but are not limited to various levels of cache memory, system memory such as dynamic random access memory or the like, and non-volatile storage such as flash memory (e.g. memory stick etc), a magnetic or optical disk. As illustrated, the storage medium stores a program 160 and a handler and/or other thread instructions such as instructions for a service thread 170. Furthermore, the memory may store a managed run-time environment 155 in which a program thread or threads may be developed and optimized in response to monitoring various events within the execution resources.

To allow the monitor 110 to monitor the desired events, the monitor 110 may be coupled to various portions of execution resources in order to detect particular conditions or to be informed of certain microarchitectural events. Signal lines may be routed to the monitor 110, or the monitor may be strategically placed with or integrated with relevant resources. The monitor 110 may include various programmable logic or software or firmware elements. For at least one embodiment, the monitor 110 may be programmed to monitor one or more architectural or microarchitectural events that are associated with architecturally-defined event combinations, or "scenarios", that may be used to trigger a yield event.

In one embodiment, logic programmed to implement the scenarios are included in hardware channels can be used individually or in combination to compose more elaborate scenarios. In one embodiment, the scenarios may be programmed using a software instruction or group of instructions. Furthermore, in one embodiment, a channel may be logically related to another channel by performing channel read instructions to perform multiple inter-related scenarios stored in multiple channels. Alternatively, the monitor 110 may be hardwired to detect a particular condition or set of conditions associated with a scenario.

Accordingly, the system illustrated in FIG. 1 may support one or more architectural events, or "yield events". The yield events transfer the execution from the currently running instruction stream to the channel's yield event service routine. The channel's service routine belongs to the same process/context of the currently running instruction stream. The yield event is signaled when the scenario associated with the channel triggers.

The monitor 110 tracks the various events or conditions, and if the events or conditions it is programmed to detect occur, then the execution resources 105 are signaled to disrupt the normal control flow the program would otherwise follow. As indicated in FIG. 1, the disruption may result in an event handler being called or a thread switch occurring. For at least one alternative embodiment, a disruption of the normal control flow of the program is not necessarily triggered if the events or conditions monitored by the monitor 110 occur. Instead, one or more of a group of architectural state storage elements, such as channels 1300, may be utilized to indicate whether a yield event should occur when all conditions for a scenario are detected by the monitor 110. That is, the channel may be programmed so that, when a scenario is detected, a yield event will occur. Without such indication in the channel, the satisfaction of a scenario, though detected, may not cause a yield event.

In one embodiment, the processor 100 illustrated in FIG. 1 includes a set of channels 1300. Each channel may specify a triggering scenario. In response to a triggering of the scenario, a yield event handler may record the occurrence of the triggering event and respond by invoking a service routine, such as channel service handler 185 illustrated in FIG. 1. The yield event handler may be a hardware, firmware, or software mechanism.

In one embodiment one or more scenarios may be programmed into one or more channels to generate a fault-like yield in the event a region of memory (either in cache or in system memory, for example) is accessed by an operation within a program running on a processor. For example, in one embodiment, scenarios may be defined to test for an access to a first region of memory, based off of a linear or physical address of the access. In addition, or instead, a scenario may be defined to test for data stored in a second address range, in one embodiment. In yet another embodiment, a range of data to be stored or accessed from memory may be tested, and a yield event triggered in response thereto. Other detectable events which may be low progress indicators may relate to various other microarchitectural or structural details of the execution resources.

FIG. 1 illustrates that the storage medium 150 may also include an operating system ("OS") 180 as well as the channel service handler mechanism 185. For at least one embodiment, the operating system 180 may be minimally involved in the user-level thread monitoring and optimization techniques described herein. For example, the OS 180 may be involved in saving and restoring contexts during yield event processing. The operating system 180 may thus provide context management services. The channel states may be part of the context that the OS 180 manages.

For at least one embodiment, however, the OS 180 is not involved with delivering the yield event. For such embodiment, the satisfaction of a programmed scenario (that is, a combination of events that have been programmed into a channel in order to trigger a yield event) triggers a yield event that is delivered via the yield event handler in hardware or firmware. For at least one embodiment, for example, the instruction triggering satisfaction of the scenario may be tagged, via hardware. Such tag may be processed in order to deliver the yield event. Such processing may occur, for example, in hardware or firmware, such as microcode ROM instructions, of the execution resources 105. This hardware or firmware mechanism that effects transfer of control for a yield event is sometimes referred to herein as the "yield event handler."

Control may be transferred, via the yield event handler, to the channel service handler 185. In this manner, processing for an architecturally-defined scenario may be performed directly by user-level code with minimal intervention of the OS 180. Scenario condition detection and yield event delivery (including control transfer) are transparent to the OS 180 for such an embodiment.

For at least one other embodiment, however, satisfaction of a scenario may trigger an internally-generated software interrupt rather than triggering a hardware-delivered yield event as discussed above. For such embodiment, the operating system 180 may invoke the channel service handler 185 when a yield event software interrupt occurs.

Regardless of how the yield event is delivered (hardware vs. software), the yield event may be handled by user-level code. That is, under either approach control may be transferred to the channel service handler 185, which may, in effect, transfer control to a user-defined service thread or handler responsive to detection of the trigger condition. This control transfer disrupts execution of the current instruction stream that was executing when the yield event occurred. The user-defined service thread or handler may include routines to optimize the threads that caused a scenario to be triggered, in one embodiment. Furthermore, in one embodiment, the user-defined service thread or handler may be used to optimize user-level programs causing a scenario trigger within a managed run-time environment, such that optimizations may be made in real-time.

In the event that a scenario is satisfied, in at least one embodiment, one or more of several functions may be performed, including setting one or more flags to indicate various states and/or generating a yield event. For example, in order to invoke another scenario in response to triggering a first scenario in which an access to a data range or address region is monitored, a flag, such as a "carry flag", may be used. In one embodiment, one or more channels can be programmed to: 1) set the carry flag but not cause a yield event or 2) set the carry flag and cause a yield event.

Furthermore, in one embodiment other flags may be used to signify other actions to be taken as a result of performing another type of scenario. For example, in order to invoke another scenario in response to triggering a first scenario in which an instruction pointer range has been accessed, a flag, such as a "zero flag", may be used. In one embodiment, one or more channels may be programmed to: 1) set the zero flag but not cause a yield event or 2) set the zero flag and cause a yield event. Similarly, in order to invoke another scenario in response to triggering a first scenario in which a branch target address has been accessed, a flag, such as an "overflow flag", may be set. For example, in one embodiment, one or more channels may be programmed to: 1) set the overflow flag but not cause a yield event or 2) set the overflow flag and cause a yield event.

In one embodiment, flags may be implemented as bit storage areas within or otherwise associated with the channel logic. Furthermore, any number of scenarios may be logically configured together to implement a combinational logic function by programming the channels associated with each scenario to set the appropriate flag after the occurrence of the corresponding event. Scenarios may be programmed to monitor the flags of other scenarios in order to invoke the scenarios in the proper sequence.

Figure 6:
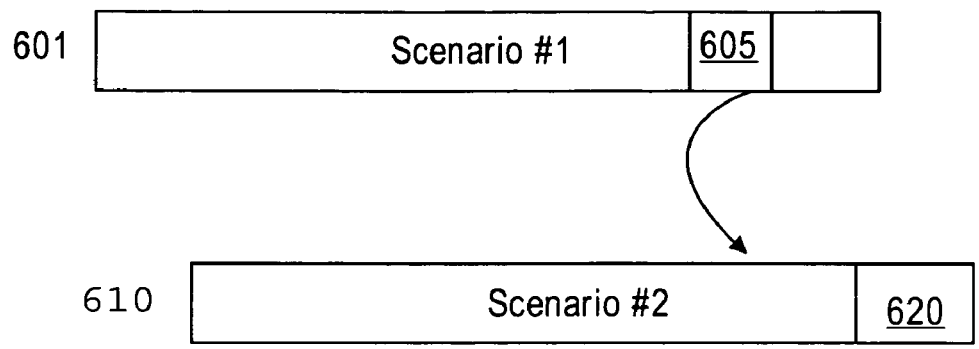
FIG. 6 illustrates a number of channels in which one or more scenarios may be programmed, according to one embodiment.
Figure 7:
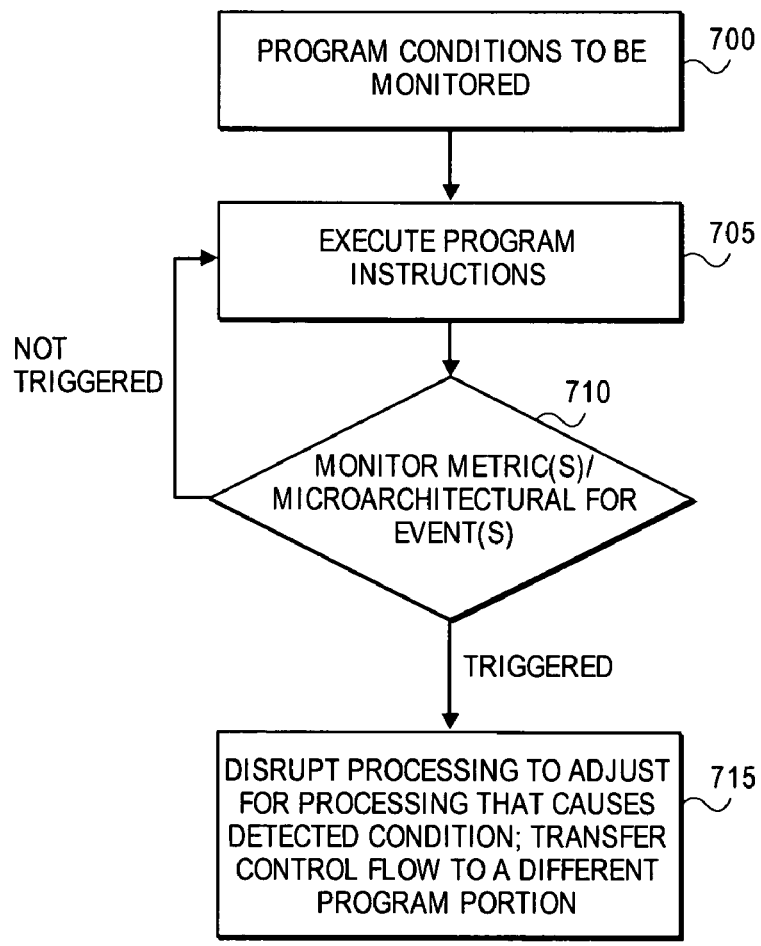
FIG. 7 is a flow diagram illustrating operations used in enabling one or more scenarios to monitor access to memory regions according to one embodiment.

FIG. 6 illustrates two channels programmed with different scenarios that are linked together by a flag, according to one embodiment. In FIG. 6, channel 601 performs a first scenario and in response to the occurrence of that scenario sets the carry flag 605, which is monitored by a second scenario programmed in channel 610. The result is a compound scenario whose output is a function of the first and second scenarios. After the second scenario is performed, in one embodiment, a yield event is signaled by yield flag 620. A handler may be performed in response to the yield flag being set that performs some function based off of the combination of the two scenarios occurring.

In one embodiment, a program may contain sentinel instructions to indicate the point in the program at which a particular scenario is to test a particular memory access, such as a read or write operation. In one embodiment, the sentinel is an instruction that performs no other functions than to indicate the point in program order at which a channel programmed with a scenario is to begin monitoring subsequent operations or instructions. In other embodiments, the sentinel may contain other functions that are to be performed in addition to indicating where the program is to begin being monitored by the scenario. In some embodiments, the sentinel may be included in the same instruction or instructions that is/are to be monitored by the scenario.

In one embodiment, a sentinel instruction may have the following format: "MOD r/m", where "MOD" indicates a modification operation from a source address, "r/m" (register/memory address) represented by a 3-byte opcode, for example. In this example, the sentinel does not contain a destination address field. However, in other embodiments, the sentinel may contain a destination address field or have other formats. The format (e.g., opcode, etc.) of the sentinel may depend, at least in part, on the particular instruction set architecture to which it belongs. For example, operands may be from memory or registers, as specified with a mod r/m format.

Below is illustrated a sequence of instructions to perform a memory access that may be monitored according to one embodiment of the invention:

Sentinel <mode>

Mov <dest>, <src>

In the above code sequence, a sentinel instruction is followed by a memory access instruction. In one embodiment, the sentinel indicates to a scenario programmed into a channel within a processor that the memory access instruction is to be monitored for an access to a first memory address or range of addresses and the data associated with the subsequent instruction. In other embodiments, the subsequent instruction may be monitored for other reasons, such as to detect whether a range of data is stored to memory by the subsequent instruction.

If the memory access instruction satisfies the condition(s) programmed into a channel or channels, then a fault-like yield may occur that invokes a handler routine to perform some operations in response to the yield event. The operations performed by the handler may vary. For example, in one embodiment, the handler informs a user that an access has been made to a certain address range. In other embodiments, the handler may perform other profiling or user-code modifications in response to the yield event, some of which will be discussed later in this disclosure. Numerous scenarios may be programmed into a channel in order to set a triggering condition for the yield event. Furthermore, in some embodiments, one or more scenarios may be programmed into one or more channels logically chained together to detect a more complex scenario.

In one embodiment, an initialization procedure is performed, wherein one or more channels in processing hardware are programmed to detect a scenario, wherein if a first sentinel is detected, the target address of a subsequent memory access operation, such as a store instruction, is compared to a range of addresses. In one embodiment, if the target address of the store instruction is within a certain range of addresses, a hardware flag or other indicator may be set to inform another scenario to monitor the occurrence of another condition, such as a specific data range corresponding to the store instruction. In this example, the first scenario would not cause a yield event, but merely set a flag or other indicator and the code sequence would continue.

In one embodiment, a second scenario may be initialized to detect the occurrence of the first scenario (described above) and to subsequently detect a range of data values corresponding to an instruction detected in the first scenario (e.g., data corresponding to the store instruction being within a certain range of data values). If the second scenario is satisfied, a yield event may occur, in one embodiment, in which a handler is invoked to perform some operations in response to the two scenarios being satisfied. In the above example, the first scenario is initialized to detect a target address of a store instruction being within a range of addresses and to set a flag in response thereto, which a second scenario is initialized to monitor in order to determine whether the store data corresponding to the store instruction is within a certain range of values or equal to a specific value, in which case a fault-like yield will occur to invoke a handler. In other embodiments, other scenarios may be initialized to detect other occurrences of memory access operations, such as memory load operations, corresponding to a range or specific memory location. In this manner, at least one embodiment can be used to perform memory region filtering.

Figure 2:
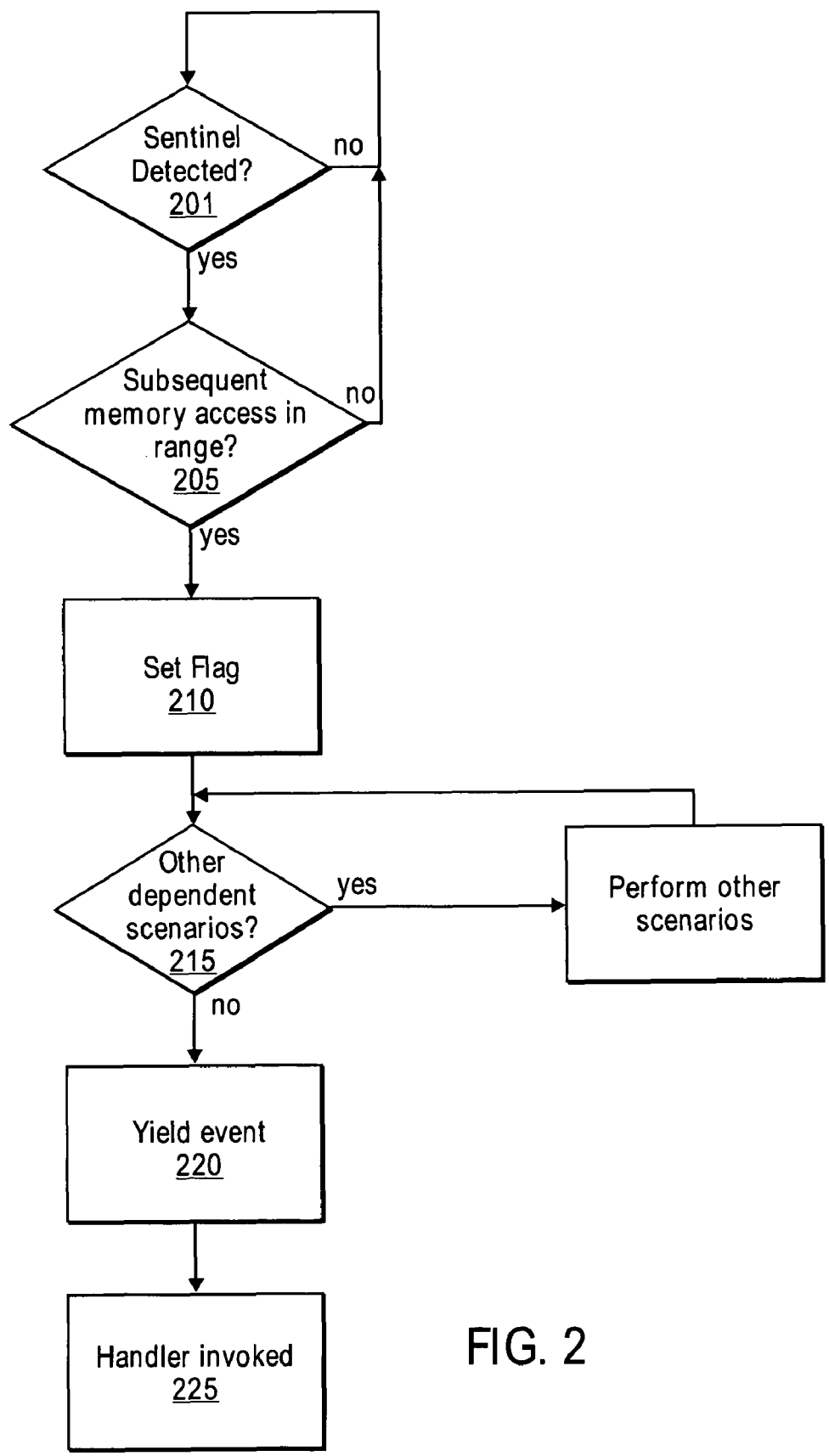
FIG. 2 is a flow diagram illustrating various aspects of at least one embodiment of the invention.

FIG. 2 is a flow diagram illustrating operations corresponding to at least one embodiment of the invention. At operation 201, the occurrence of a first sentinel is monitored. If the first sentinel is not detected, program operation continues. If the first sentinel is detected, then at operation 205 it is determined whether a subsequent memory access operation corresponds to a memory location or range of memory locations of interest. If so then, at operation 210, a flag is set to indicate the satisfaction of the first scenario. In one embodiment, the subsequent memory access operation may be a store instruction that has a target address or a certain range of target addresses of interest. In other embodiments, the subsequent memory access operation may be a load instruction corresponding to a certain load address or range of load addresses. If the first sentinel is detected and if the flag was set from the first scenario and the data corresponding to the memory access operation is equal to a certain value or falls within a certain range or data values and if at operation 215 there are no other scenarios dependent on the result of the prior scenario, a fault-like yield occurs at operation 220 and a handler is invoked at operation 225. If the flag from the first scenario was not set or if the data value corresponding to the memory access is not of a certain value or range, then no yield event occurs and program operation continues.

Embodiments described herein may be applied to various memory accesses, including accesses by load or store operations from/to memory, accesses by instruction pointer to various regions of memory, and accesses to memory regions corresponding to code branch targets, etc. Furthermore, at least one embodiment may be used to filter addresses and/or data value ranges accessed by an instruction, an instruction pointer, or a branch target.

If a fault-like yield occurs in the above example, a handler may be invoked to perform any number of operations. For example, in one embodiment, various profiling operations may be performed in response to the above scenarios being satisfied, such that a program that caused the yield event may be modified in real-time. In one embodiment, the satisfaction of one or more scenarios in response to the occurrence of one or more memory access operations may invoke a program to protect various memory areas from being accessed by programs or instructions that are not supposed to access the memory area.

For example, in one embodiment, the memory region filtering techniques described above can be used to detect when a software program thread is trying to access an object that is not allocated in its heap kindergarten, stack, or other memory area, and prevent future accesses from occurring. Furthermore, one embodiment allows objects to be speculatively allocated on a stack if a pointer will likely not be published outside the stack. This may save cache thrashing while saving stack access time. Alternatively, in one embodiment, objects are allowed to be stored in a thread-specific heap kindergarten, such that the pointers to the kindergarten may be maintained and garbage collection performed for the kindergarten without regard to performing garbage collection in other areas of the heap for the thread. Moreover, if an access is made to a kindergarten corresponding to a particular thread or threads, at least one embodiment may trigger a scenario to handle the event, resulting in a fault-like yield, for example.

In one embodiment, a sentinel instruction may detect an access to memory and subsequently trigger a scenario, which may define one or more triggering events that will cause a fault-like yield. In at least one embodiment, the scenario may actually be comprised of multiple scenarios logically connected according to some triggering function to form a compound scenario. However, in other embodiments, one or more of the triggering events defined in the one or more scenarios may be defined in a sentinel instruction or a combination of sentinal instructions, logically linked together, such that the number of scenarios the sentinel (or compound sentinel) triggers is reduced.

In some embodiments, the sentinel instructions may be used to define other parameters, besides only an access to a memory region. For example, in one embodiment, one sentinel may control a time window in which accesses to a memory region are monitored by another sentinel. For example, a first sentinel may set a flag to indicate to another sentinel that it is to begin monitoring accesses to a memory region. The first sentinel may later clear the flag to indicate to the other sentinel to stop monitoring accesses to the memory region.

In some embodiments, sentinels may also define input/output (I/O) ranges to monitor in addition to or in lieu of memory regions. In one embodiment, I/O's are monitored according to a range of addresses, whereas in other embodiments a sentinel may monitor access to a range of I/O's according to some combination of bits (e.g., "bit map"), each of which corresponding to a different I/O.

Advantageously, one or more embodiments of the invention may enable user programs, such as a software application running within an operating system access to processor resources, at least abstractly, traditionally available only to the OS kernel according to a privilege level. For example, in one embodiment, a user program may use a sentinel to monitor memory accesses to a region and perform actions in response thereto that affect highly privileged processing resources, such as privileged resources at "ring 0" in one processing architecture. Other processing architectures may define different level of resource privileges, and may use embodiments to disable or enable a user program to access these resources.

In certain applications where data may be shared among concurrent threads, code and additional data structures must be added to enforce mutually exclusive access to data objects, such that only one thread at a time accesses a given data object. These lock mechanisms introduce performance overhead. The techniques described herein allow data objects to be grouped into regions of memory which are accessed by only one thread, and they monitor accesses from other threads to ensure mutual exclusion.

In one embodiment, regions of memory may be filtered according to the techniques described herein to prevent accesses to protected, or "un-locked," data. For example, certain data stored in memory may be designated for a particular thread, while other data may be used by a number of different threads. Accordingly, at least one embodiment of the invention may detect accesses to data that is allocated only for a particular thread and prevent accesses to this "locked" data by unauthorized threads. Conversely, embodiments of the invention may allow a number of threads to access data that may not be exclusive to a particular thread, or "un-locked". In this example, threads may be allowed to use a lock-free version of the code when the object is stored in a memory space designated as a "thread-local" memory space, whereas threads may only be allowed to use locked versions of the code to access data in another memory space under certain circumstances.

Embodiments of the invention may be used in other applications as well. In the area of security, for example, at least one embodiment may be used to monitor memory accesses and invoke handlers to allow a user to adjust various security parameters in the software in real time. Specifically, at least one embodiment may be used to protect trusted or mechanically-verified code from being modified by a rogue agent within the same process, protect private data structures from being visible to unauthorized agents within the same process, protect data structures from being modified by unauthorized agents within the same process, or enable authorized code to access protected structures without any performance overhead.

In one embodiment, accesses to code objects, such as those recognized in various programming languages, may be monitored and detected, particularly if an access attempts to load or store data from/to a heap or stack outside of one to which the access corresponds. For example, a first channel may be programmed with a scenario to determine whether an object load's address (x) is not within a global heap range (r1) allocated to the object load nor within a thread-specific heap range (r2) allocated to the object load. In order to trigger the scenario to check the object load's address, a first sentinel instruction may be used prior to the object load in program order.

In the case of an object store operation, a second sentinel may be used to trigger a scenario programmed into a second channel to determine whether the object store's address (y) does not correspond to r2, but yet the object store's data (z) is stored to r2. If so, then it may be assumed that the object store is attempting to publish data outside of the local heap to which it corresponds.

Figure 8:
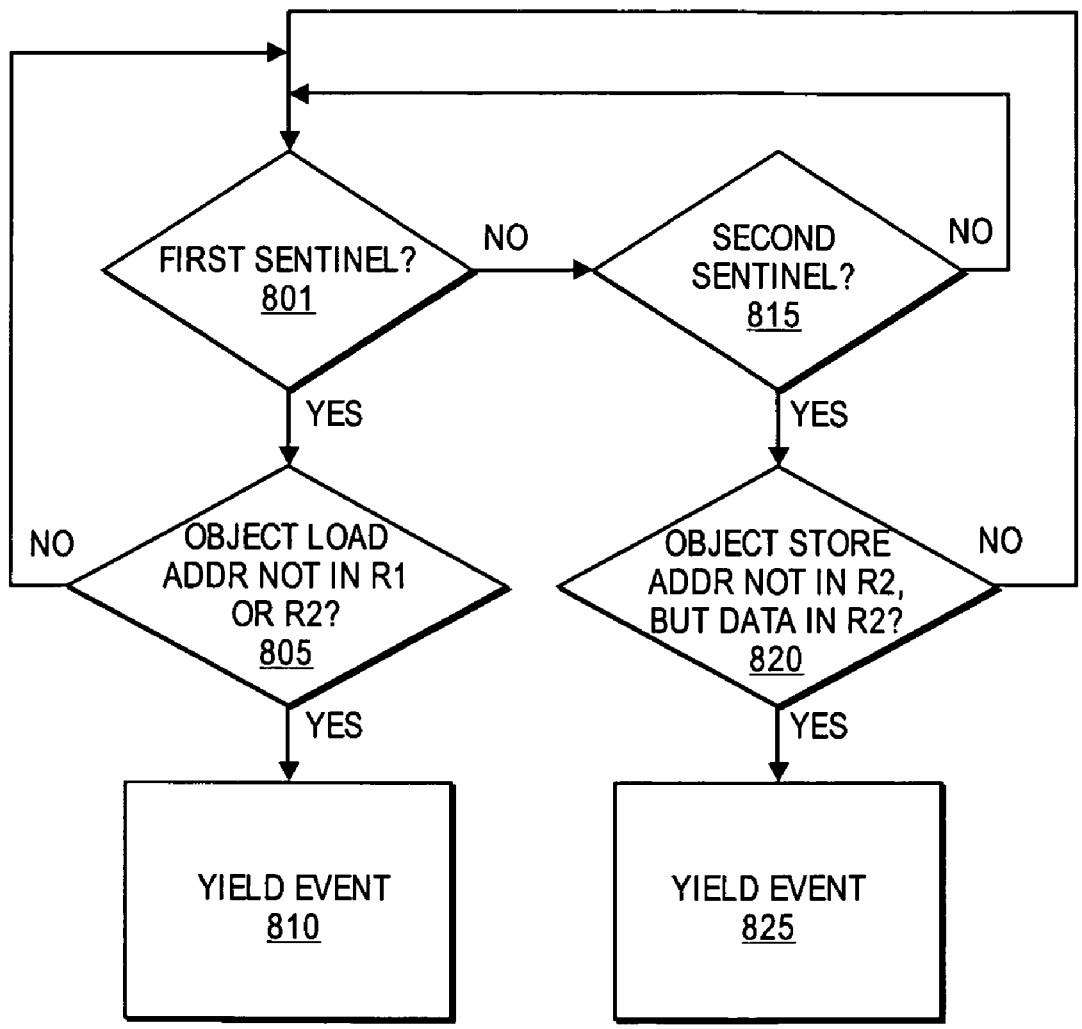
FIG. 8 is a flow diagram illustrating operatons used in one embodiment.

FIG. 8 is a flow diagram illustrating operations used in one embodiment, in which an object load and an object store are monitored to determine whether they have attempted to access a memory region outside of their corresponding software heaps. At operation 801, if a first sentinel is detected, a first scenario, at operation 805, tests whether a subsequent object load's address (x) is not within a global heap range (r1) allocated to the object load nor within a thread-specific heap range (r2). If so, then at operation 810 a yield event may occur to invoke a handler to reissue and/or cancel the object load. If not, then at operation 815, it is determined whether a second sentinel is detected, and if so, then at operation 820, it is determined whether the object store's address (y) does not correspond to r2, but yet the object store's data (z) is stored to r2. If so, then at operation 825, a yield event occurs to invoke a handler to reissue and/or cancel the object store.

In addition to applications described above that may be used in managed run-time environments, embodiments of the invention may be used in other ways irrespective of a managed run-time environment. For example, in one embodiment, the memory region filtering techniques described above may be used to detect and recover from access to thread-specific objects or to implement coherency protocols between memory regions or types of memories. Numerous other applications may take advantage of embodiments described herein.

Figure 3:
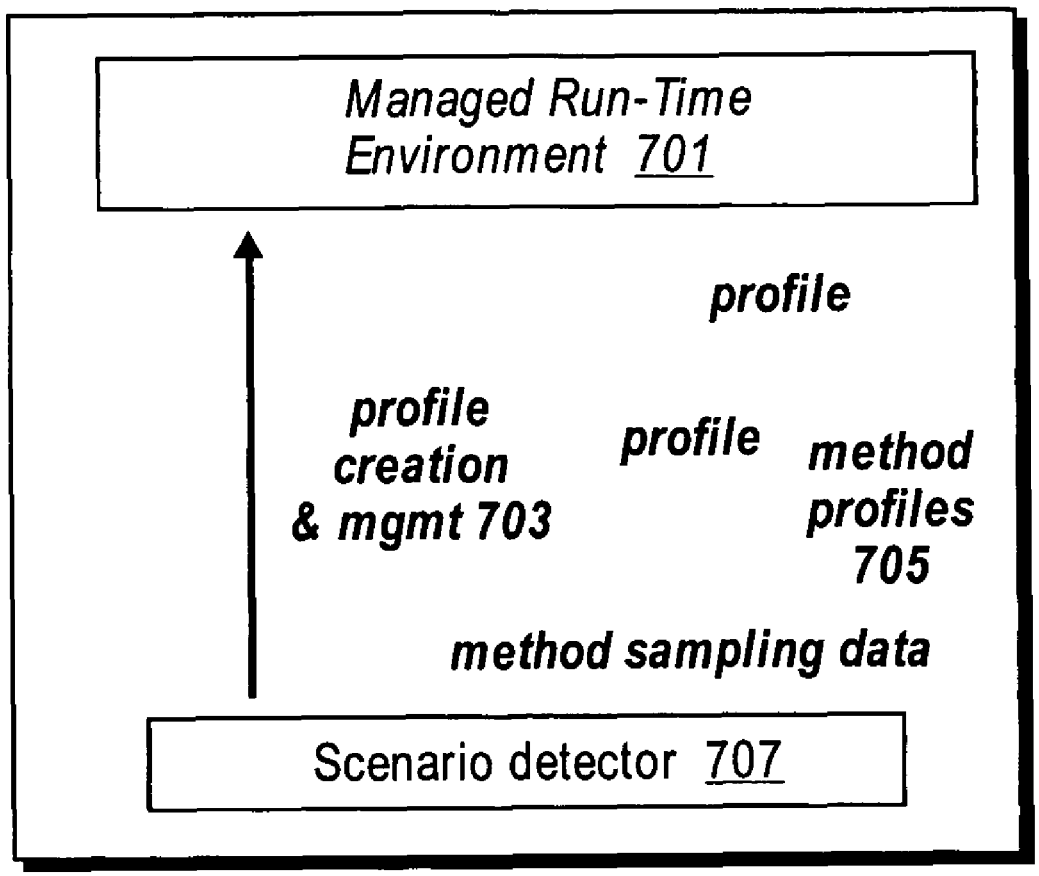
FIG. 3 illustrates a managed run-time environment in which one embodiment may be used.

FIG. 3 illustrates a system to monitor events occurring within processing resources and to use the monitored events to improve or optimize user-level software programs running within the architecture, according one embodiment. Particularly, FIG. 3 illustrates a managed run-time environment 301, in which user-level software programs, such as applications, may be developed. In other embodiments, the environment 301 may be a non-managed run-time environment. In one embodiment, a software program is performed by a CPU 320, which may include a plurality of processing resources, such as a multi-core processor and/or multiple processors. Channels 315 may be programmed via the profiling application programming interface (API) 310 to monitor events and scenarios useful in detecting certain performance characteristics of the CPU, such as code hotspots. Performance characteristics, such as code hotspots may be detected by logic or software 307 by interpreting the results of the events and scenarios programmed into the channels. Furthermore, yield actions programmed into the channels may also be interpreted and the proper handlers invoked in response thereto by the detection code/logic 307.

The performance information interpreted and detected by the detection logic/code 307 may be used to generate a profile of the monitored characteristic(s) by profile generation code or logic 303, which may then be translated into specific actions or methods by profile method generation code or logic 305 to improve or optimize a user's code, such as an application, within the managed-run time environment. Moreover, the improvements to a user's code may be done, in one embodiment, in real-time and on a per-thread basis with little or no detection overhead imposed by the performance monitoring architecture of FIG. 3. In other embodiments, other stages or functional units may be used to generate the information required to detect performance information within the CPU and to optimize a user's code in response thereto.

Figure 4:
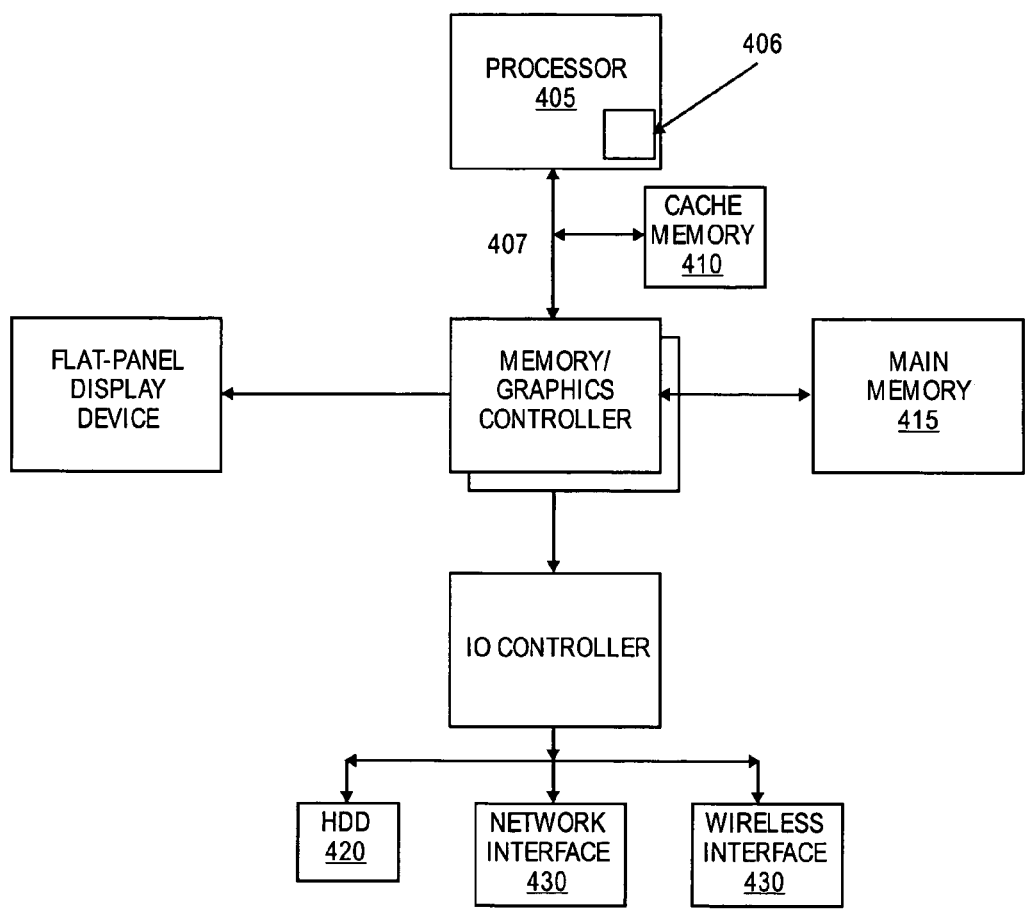
FIG. 4 illustrates a shared-bus system in which at least one embodiment may be used.

FIG. 4 illustrates a front-side-bus (FSB) computer system in which one embodiment of the invention may be used. A processor 405 accesses data from a level one (L1) cache memory 410 and main memory 415. In other embodiments of the invention, the cache memory may be a level two (L2) cache or other memory within a computer system memory hierarchy. Furthermore, in some embodiments, the computer system of FIG. 4 may contain both a L1 cache and an L2 cache.

Illustrated within the processor of FIG. 4 is a storage area 406 for machine state. In one embodiment storage area may be a set of registers, whereas in other embodiments the storage area may be other memory structures. Also illustrated in FIG. 4 is a storage area 407 for save area segments, according to one embodiment. In other embodiments, the save area segments may be in other devices or memory structures. The processor may have any number of processing cores. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 420, or a memory source located remotely from the computer system via network interface 430 containing various storage devices and technologies. The cache memory may be located either within the processor or in close proximity to the processor, such as on the processor's local bus 407.

Figure 5:
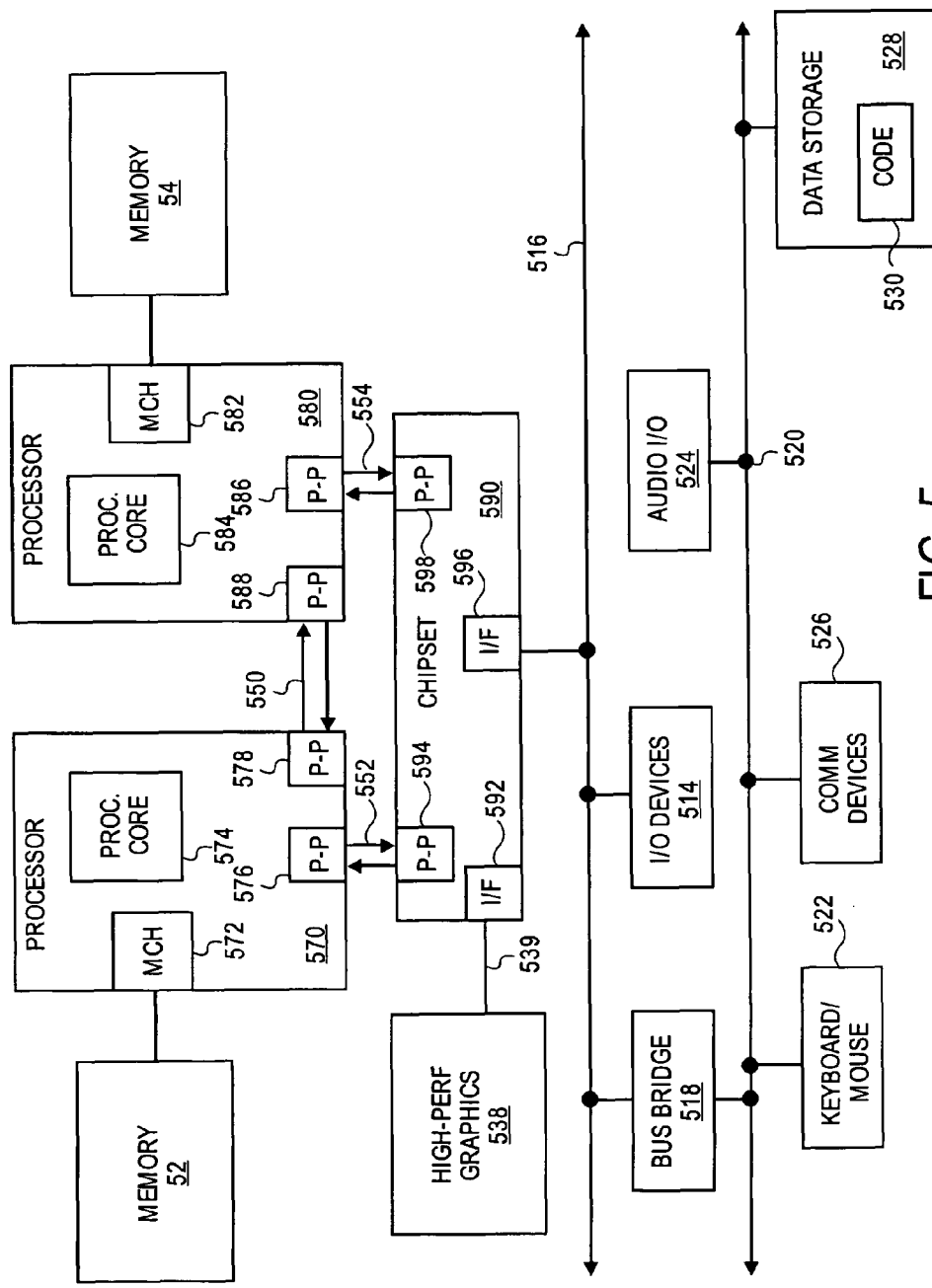
FIG. 5 illustrates a point-to-point bus in which at least one embodiment of the invention may be used.

Furthermore, the cache memory may contain relatively fast memory cells, such as a six-transistor (6T) cell, or other memory cell of approximately equal or faster access speed. The computer system of FIG. 4 may be a point-to-point (PtP) network of bus agents, such as microprocessors, that communicate via bus signals dedicated to each agent on the PtP network. FIG. 5 illustrates a computer system that is arranged in a point-to-point (PtP) configuration. In particular, FIG. 5 shows a system where processors, memory, and input/output devices are interconnected by a number of point-to-point interfaces.

The system of FIG. 5 may also include several processors, of which only two, processors 570, 580 are shown for clarity. Processors 570, 580 may each include a local memory controller hub (MCH) 572, 582 to connect with memory 22, 24. Processors 570, 580 may exchange data via a point-to-point (PtP) interface 550 using PtP interface circuits 578, 588. Processors 570, 580 may each exchange data with a chipset 590 via individual PtP interfaces 552, 554 using point to point interface circuits 576, 594, 586, 598. Chipset 590 may also exchange data with a high-performance graphics circuit 538 via a high-performance graphics interface 539. Embodiments of the invention may be located within any processor having any number of processing cores, or within each of the PtP bus agents of FIG. 5.

Other embodiments of the invention, however, may exist in other circuits, logic units, or devices within the system of FIG. 5. Furthermore, in other embodiments of the invention may be distributed throughout several circuits, logic units, or devices illustrated in FIG. 5.

Processors referred to herein, or any other component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these mediums may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may be making copies of an article, e.g., a carrier wave, embodying techniques of the present invention.

Thus, techniques for steering memory accesses, such as loads or stores are disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Various aspects of one or more embodiments of the invention may be described, discussed, or otherwise referred to in an advertisement for a processor or computer system in which one or more embodiments of the invention may be used. Such advertisements may include, but are not limited to news print, magazines, billboards, or other paper or otherwise tangible media. In particular, various aspects of one or more embodiments of the invention may be advertised on the internet via websites, "pop-up" advertisements, or other web-based media, whether or not a server hosting the program to generate the website or pop-up is located in the United States of America or its territories.

What is claimed is:

1. An apparatus comprising:
   a first logic to determine whether a memory access operation is to access one or more memory regions and to cause a yield event in response thereto, the yield event to invoke an interrupt handler to perform one or more functions in response to the memory access operation accessing the one or more memory regions,
   wherein the memory access operation is to be preceded in program order by an instruction, for which there is no corresponding load destination address, the instruction to indicate to the first logic that instructions subsequent to the instruction, in program order, are to be monitored for the operation that is to access the one or more memory regions; and wherein a plurality of flag storage areas, coupled to the first logic, is to comprise at least one flag to indicate from a first scenario of a plurality of scenarios to a second scenario of the plurality of scenarios whether the second scenario is to monitor the access to the one or more memory regions.

2. The apparatus of claim 1, wherein the instruction comprises a sentinel instruction.

3. The apparatus of claim 1, wherein the instruction comprises a load operation.

4. The apparatus of claim 1 further comprising a second logic to determine whether a data corresponding to the memory access operation is within a range of values.

5. The apparatus of claim 4, wherein the first logic is to set a flag to indicate to the second logic whether the second logic is to determine whether the data corresponding to the memory access operation is within the range of values.

6. The apparatus of claim 5, wherein the yield event includes a fault-like yield operation.

7. The apparatus of claim 6, wherein the first and second logic include one or more programmable channels to perform one or more scenarios in response to detecting a sentinel instruction.

8. A system comprising:
a memory to store an instruction;
a processor to monitor instructions subsequent to the instruction in program order for an access to one or more address ranges, wherein the access includes a branch target address, wherein the processor includes a plurality of channels to be programmed with a plurality of scenarios to monitor the access to the one or more address ranges, wherein the processor is to comprise a plurality of flag storage areas comprising at least one flag to indicate from a first scenario of the plurality of scenarios to a second scenario of the plurality of scenarios whether the second scenario is to monitor the access to the one or more address ranges.

9. The system of claim 8, wherein the access includes a memory load or store address.

10. The system of claim 8, wherein the access includes an instruction pointer to a stack.

11. The system of claim 8, wherein the instruction is to comprise a sentinel instruction.

12. The system of claim 8, wherein the processor is to monitor the access to the one or more address ranges for data within a data range.

13. The system of claim 8, wherein one or more of the plurality of flag storage areas corresponding to the plurality of scenarios are to indicate whether the access to the one or more address ranges is to cause a yield event.

14. The system of claim 8, wherein the one or more address ranges includes one or more linear address ranges.

* * * * *